United States Patent [19]

Harvey et al.

[11] 4,255,034
[45] Mar. 10, 1981

[54] FILM RETENTION IN CARTRIDGE ASSEMBLY

[75] Inventors: Frederick W. Harvey, Webster; Gurdip S. Sethi, Rochester, both of N.Y.

[73] Assignee: Eastman Kodak Company, Rochester, N.Y.

[21] Appl. No.: 106,629

[22] Filed: Dec. 26, 1979

[30] Foreign Application Priority Data

Aug. 8, 1979 [EP]  European Pat. off. ........ 79-102786.5

[51] Int. Cl.³ .............................................. G03B 17/32
[52] U.S. Cl. ..................................... 354/121; 354/275
[58] Field of Search ............... 354/121, 123, 124, 203, 354/275; 352/75, 76

[56] References Cited

U.S. PATENT DOCUMENTS

| | | | |
|---|---|---|---|
| 3,227,058 | 1/1966 | Hochreiter | 354/275 |
| 4,194,822 | 3/1980 | Sethi | 354/275 X |
| 4,202,614 | 5/1980 | Harvey | 354/121 |

*Primary Examiner*—John Gonzales

*Attorney, Agent, or Firm*—Milton S. Sales

[57] ABSTRACT

A photographic film cartridge assembly includes (1) an opaque casing with an exposure window in one wall and (2) a film unit with photographic film. The film unit has an exposure region and is mounted in the casing for movement in a film advancing direction relative to the casing such that successive portions of the exposure region align with the exposure window. A cover member, including an opaque region, is mounted in the casing between the wall and the film for movement independent of the film unit. The cover member is movable between a closing position, in which said opaque region is aligned with and closes the exposure window, and an opening position, in which said opaque region is out of alignment with and opens the exposure window. Means, associated with the film unit and the cover member are provided for inhibiting movement of the film unit in the film advancing direction when the cover member is in its exposure window closing position. The movement inhibiting means are disabled when the cover member is in its exposure window opening position.

10 Claims, 9 Drawing Figures

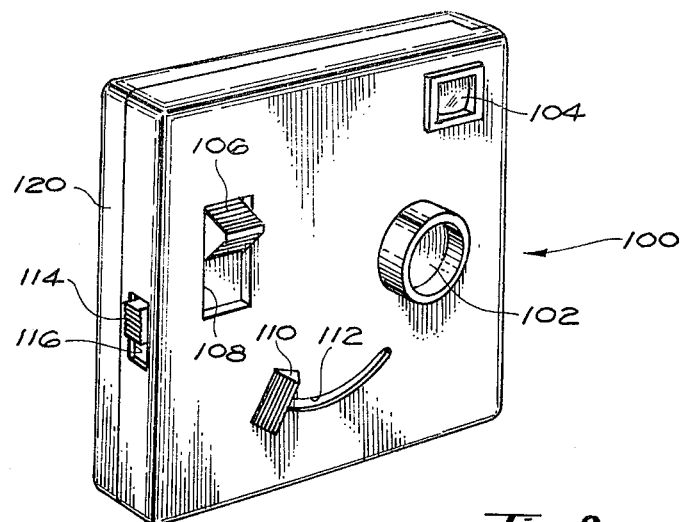
_Fig_8
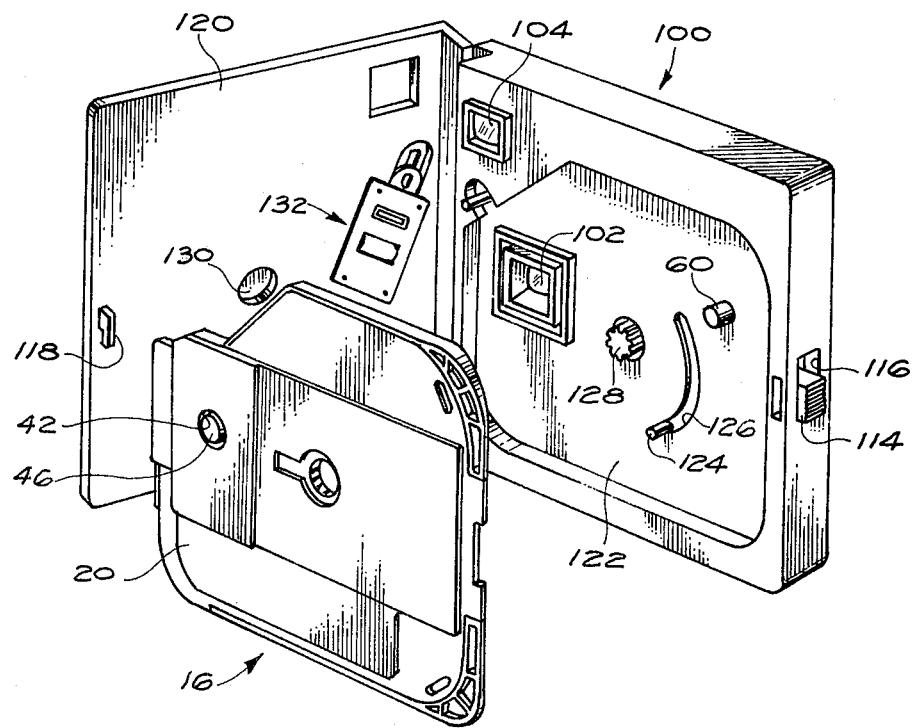
_Fig_9

FILM RETENTION IN CARTRIDGE ASSEMBLY

BACKGROUND OF THE INVENTION

CROSS-REFERENCE TO RELATED APPLICATIONS

Reference is hereby made to commonly-assigned, copending U.S. patent applications Ser. No. 931,053 entitled PHOTOGRAPHIC FILM CARTRIDGE ASSEMBLY AND CAMERA filed in the name of G. S. Sethi on Aug. 4, 1978 now U.S. Pat. No. 4,194,822; Ser. No. 031,266 entitled PRESSURE MEMBER URGING MECHANISM filed in the names of N. D. Hozman, R. L. Reynolds, and T. G. Kirn on Apr. 18, 1979; and Ser. No. 106,630 entitled FILM CARTRIDGE ASSEMBLY WITH PRESSURE PLATE filed in the name of G. S. Sethi concurrently herewith.

FIELD OF THE INVENTION

The present invention relates to film cartridge assemblies for use with cameras and, more specifically, to means in such cartridge assemblies for inhibiting undesired movement of the film in the cartridge casing.

DESCRIPTION OF THE PRIOR ART

It is commonplace to enclose photographic film in a cartridge, cassette, magazine, or the like, designed to afford convenient loading of a camera. Such enclosures typically have been configured to accommodate an elongated strip of roll film. It is also known to provide a plurality of exposure areas in a generally circular array on a disk-shaped sheet of film and to rotate such film disk incrementally to bring successive exposure areas into alignment with the camera's optical axis for exposure. An illustrative example of a film disk arrangement is shown in commonly-assigned, copending U.S. patent application Ser. No. 931,053 entitled PHOTOGRAPHIC FILM CARTRIDGE ASSEMBLY AND CAMERA filed on Aug. 4, 1978, in the name of G. S. Sethi.

In that patent application, a film disk is mounted on a central core to form a film unit adapted to be rotatably supported within a protective casing for insertion into a camera. The film disk has a plurality of image areas along a generally circular exposure region extending substantially around the core so that individual image areas are brought into alignment with an exposure window in the casing as the disk is rotated. The cartridge assembly also includes a cover member having an opaque leaf portion which is rotatable independently of the film unit. When the cartridge is not in a camera, the leaf portion underlies the casing's exposure window to prevent film fogging.

In the Sethi patent application, the film unit is prevented from rotation in a reverse direction by a ratchet mechanism. However, when the cartridge assembly is not in a camera, it is possible to rotate the film unit in a film advancing direction by manual manipulation. Although such manipulation would, of course, be operator misuse, the resulting loss of image area availability and waste of film may lead to user dissatisfaction with the product. In cartridge assemblies in accordance with the present invention, inadvertent film unit advancement when the cartridge assembly is not in a camera is inhibited.

SUMMARY OF THE INVENTION

In accordance with the present invention, a photographic cartridge assembly includes (1) an opaque casing with an exposure window in its front wall and (2) a film unit mounted in the casing for movement in a film advancing direction such that successive portions of the film unit align with the exposure window. A cover member is mounted in the casing between the front wall and the film unit for movement, independent of the film unit, to selectively align an opaque region with the exposure window. Means, associated with the film unit and the cover member, are provided for inhibiting movement of the film unit in the film advancing direction when the opaque region is in alignment with the exposure window. The movement inhibiting means is disabled when the opaque region is out of alignment with the exposure window.

In a preferred embodiment of the present invention, the film is disk-shaped. The movement inhibiting means includes (1) a discontinuity associated with each image area and (2) a tooth on the cover member for engaging the discontinuities. When the cover member is moved from alignment with the exposure window, a separator layer between the cover member and the film inhibits connection between the tooth and the discontinuities. The discontinuities may also be used in conjunction with a camera's film metering mechanism to locate associated image areas along the camera's optical axis.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 8 is a front perspective view of a still picture camera which is suitable for use with the cartridge assembly of FIG. 1; and FIG. 9 is a rear perspective view of the still picture camera of FIG. 8 and of a film cartridge assembly showing the camera opened for receiving the cartridge assembly.

DESCRIPTION OF THE PREFERRED EMBODIMENT

Various terms such as "cartridge," "cassette," and "magazine" have been used to refer to film containers. Such a container, when loaded with film, is herein referred to as a "cartridge assembly." Because cartridges, cartridge assemblies, and photographic cameras for use therewith are well known, the present description is directed in particular to elements forming part of or cooperating more directly with cartridge assembly elements to which the present invention is specifically directed.

The present invention is an improvement of the cartridge assembly described in aforementioned U.S. patent application Ser. No. 931,053. Any structure not shown herein may take the form shown in that application, and the disclosure of such application is hereby specifically incorporated into the present description. Apparatus that is not specifically shown or described herein or in the incorporated application is understood to be selectable from apparatus known in the art.

Figure 1:
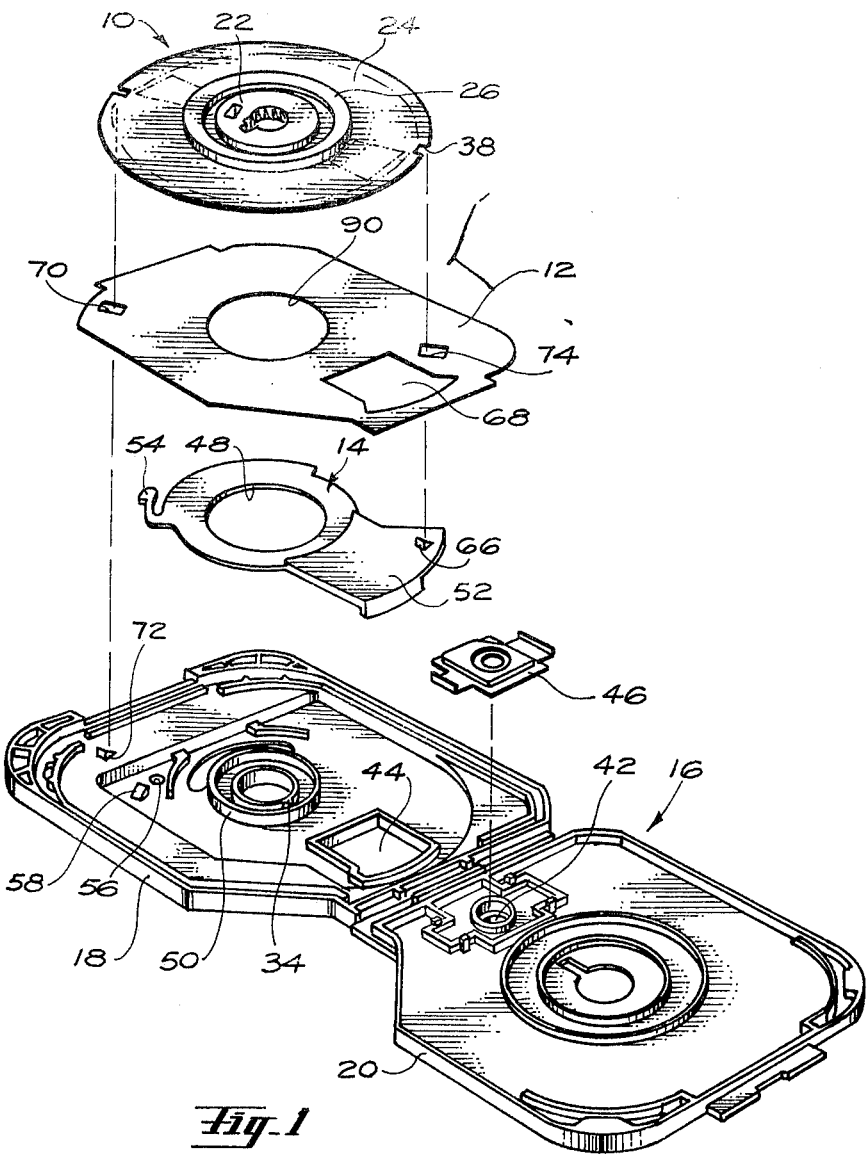
FIG. 1 is a view in exploded perspective of an open film cartridge assembly in accordance with the present invention.
Figure 2:
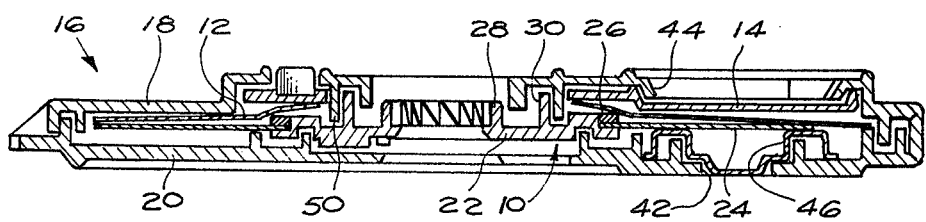
FIG. 2 is a sectional view of the closed cartridge assembly of FIG. 1.

A cartridge assembly, shown in exploded perspective in FIG. 1 and in sectioned elevation in FIG. 2, includes a film unit 10, a separator layer 12, a cover member 14, and a casing 16 with front and rear parts 18 and 20, respectively. The terms "front" and "rear" are used herein with reference to the orientation of the cartridge assembly during actual use of the apparatus described. That is, the front of the cartridge would face along the camera's optical axis in a direction toward the taking lens.

Film unit 10, includes a central core 22 (shown enlarged front and rear in FIGS. 3 and 4, respectively), a film disk 24, and a mounting ring 26 which is bonded to core 22 to secure film disk 24. The film disk is illustrated as having a generally circular outer perimeter, but other non-circular (e.g., polygonal) film shapes may be visualized for use in accordance with the present invention. Accordingly, the term "disk" as herein used is intended to include non-circular as well as the illustrated circular configuration.

Film disk 24 comprises a moderately flexible but self-supporting base sheet formed of, for example, cellulose acetate or poly(ethylene terephthalate). The base sheet carries photosensitive elements on one face thereof, thus providing a photographic imaging surface on which a latent photographic image can be recorded and subsequently photographically developed.

Film disk 24 is arranged to record photographic images in a circular exposure region concentric with the film unit axis.

Figure 3:
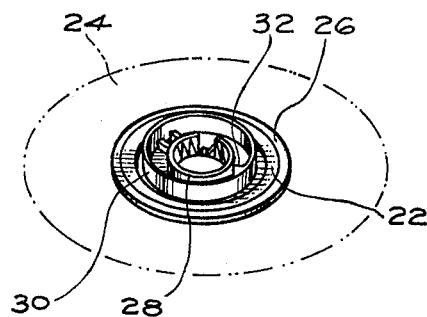
FIG. 3 is a front perspective view of the central core portion of the cartridge assembly of FIG. 1.
Figure 4:
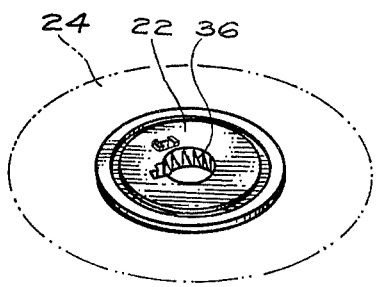
FIG. 4 is a rear perspective view of the central core portion of FIG. 3.

Referring to FIG. 3, central core 22 includes an inner raised ring 28, about a central opening, and an outer raised ring 30. A projection 32 extends inwardly from ring 30 to form, with a projection 34 on front casing part 18, part of an initial and final locking system explained in detail in aforementioned U.S. patent application No. 931,053.

The inner surface 36 of inner ring 28 has splines for driving engagement with camera structure. The perimeter of film disk 24 is notched as at 38 (two notches being shown in FIG. 1) to provide discontinuity means for cooperation with a camera's metering pawl to locate successive portions of the film disk in alignment with exposure window 44.

Rear casing part 20 of the cartridge assembly has a circular opening 42, aligned with an exposure window 44 in front casing part 18. An opaque, rigid pressure plate 46 is received in the rear casing part behind the film disk 24 and is movable toward and away from the front casing part to selectively be brought to bear against the rear surface of the film disk. The pressure plate, in bearing against the film disk, presses the film disk into contact with a camera's film support surface extending into exposure window 44. Details of the pressure plate and the camera mechanism which cooperates therewith are disclosed in commonly-assigned, copending U.S. patent application Ser. No. 106,630 entitled FILM CARTRIDGE ASSEMBLY WITH PRESSURE PLATE filed in the name of G. S. Sethi concurrently herewith.

Cover member 14 has a central opening 48 sized to receive an annular wall 50 of casing top part 18 so that the cover member can rotatably move about the axis of the annular wall. The cover member is formed of suitably thin but relatively stiff, sheet material and includes a generally fan-shaped leaf portion 52 so sized as to cover exposure window 44. At least leaf portion 52 of the cover member is opaque.

Figure 5:
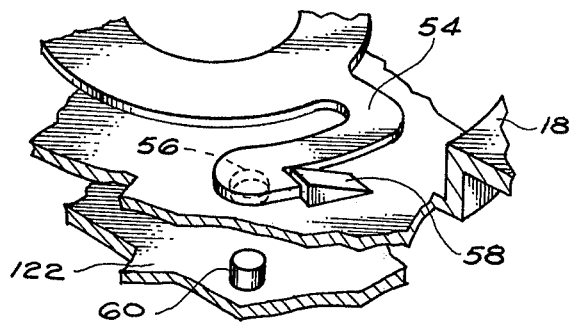
FIG. 5 is a detailed perspective view of a portion of the cartridge assembly of FIG. 1.
Figure 6:
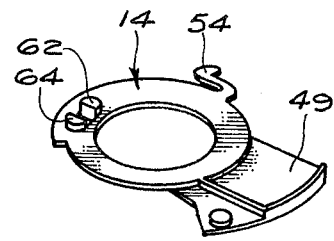
FIG. 6 is a front perspective view of the cover member portion of the cartridge assembly of FIG. 1.
Figure 7:
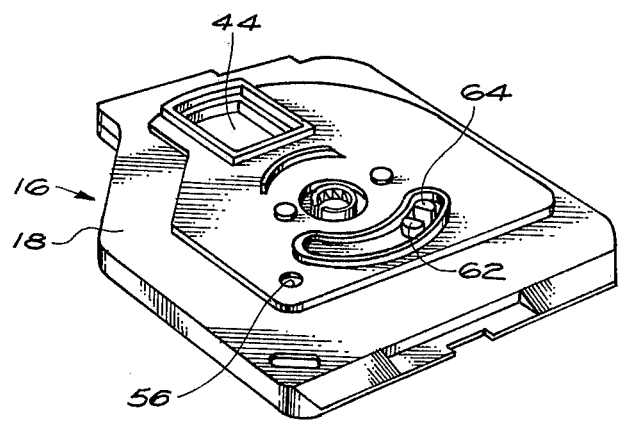
FIG. 7 is a front perspective view of the film cartridge assembly of FIG. 1.

A locking mechanism for preventing inadvertent rotation of the cover member before the cartridge assembly is loaded into a camera includes a tab 54 on cover member 14. The tab is aligned with an aperture 56 in front casing part 18, and as shown in FIG. 5 engages tooth 58 of the casing top part when leaf portion 52 is aligned with exposure window 44. Tab 54 is depressed by a camera pin 60 (shown in FIG. 9 and detailed in FIG. 5) to disable the locking mechanism when the cartridge assembly is received in a camera. Cover member 14 also includes a pair of lugs 62 and 64, shown in FIG. 6, and a ramped tooth 66 shown in FIG. 1. The functions of the lugs and the tooth will be explained hereinafter.

Still referring to FIG. 1, separator layer 12 is formed of an opaque sheet material and has a central aperture 90 sized to receive annular wall 50 of the casing front part. A framing window 68 in the separator layer is aligned with exposure window 44. A hole 70 in the separator layer is aligned with a ramped tooth 72 on top casing part 18 so that the tooth 72 may pass through hole 70 and enter notches 38 on the periphery of film disk 24 to inhibit reverse rotation of film unit 10 after the cartridge assembly is removed from a camera.

Another hole 74 in the separator layer is radially aligned with notches 38. Before the cartridge assembly is loaded into a camera, cover member leaf portion 52 aligns with exposure window 44 and ramped tooth 66 passes through hole 74 and enters a notch 38. Tooth 66 and the notch cooperate to inhibit rotation of disk assembly 10 in a forward direction.

In this configuration, leaf portion 52 of cover member 14 is in light blocking relationship with exposure window 44 and separator layer window 68. Inasmuch as leaf portion 52 is larger than the aligned windows 44 and 68 between which it is interposed, a labyrinth light baffling arrangement is created to restrict the access of actinic light rays to film disk 24 through the windows.

The cartridge assembly is adapted to be received in a camera such as shown schematically in FIGS. 8 and 9 and referred to by numeral 100. The camera is similar in certain respects to the camera disclosed in commonly-assigned copending U.S. patent application Ser. No. 031,266 entitled PRESSURE MEMBER URGING MECHANISM filed in the names of N. D. Hozman, R. L. Reynolds, and T. G. Kirn on Apr. 18, 1979. The camera front shown in FIG. 8 includes a picture-taking lens 102, a viewfinder 104, a shutter release button 106 movable along a slot 108, and a tab 110 movable along an arcuate slot 112. A locking tab 114 at one side of camera 100 is movable along a slot 116 to disengage from an internal latch 118 (FIG. 9) located on a rear door 120 of the camera, whereupon the rear door may be opened for loading a film cartridge assembly into a receiving chamber 122 of the camera.

When the cartridge assembly is received in chamber 122, a pin 124, coupled to film advance tab 110 and extending from an arcuate slot 126, engages film drive lugs 62 and 64 (FIG. 6) on cover member 14. A splined rotatable post 128, projecting into camera chamber 122, extends through the center opening in core 22 of the received cartridge assembly. When loading door 120 is closed, post 128 extends into a recess 130 in the door.

When the film cartridge assembly is loaded into camera chamber 122, pin 60 enters the cartridge assembly through an opening 56 to move tab 54 from alignment with tooth 58. Now cover member 14 can be rotated by pin 124 from its exposure window closing position. As the cover member turns, ramped tooth 66 is moved from the region of hole 74 in separator layer 12 and rides up on the surface of the separator layer. Now the tooth can no longer enter film disk notches 38, and the film unit can be turned by incremental rotation of splined post 128. This moves successive exposure areas of film disk 24 across exposure window 44.

When the operator desires to remove the cartridge assembly from the camera, either when all frames have been exposed or temporarily to load the camera with a cartridge containing a different type of film (i.e., slide vs. print film, color vs. black and white, or one A.S.A. value vs. another), the operator rotates tab 110 from its FIG. 8 position in a counterclockwise direction until cover member 14 returns to its exposure window closing position. Only then can door 120 be opened and the cartridge assembly removed from the camera.

The mechanism shown at 132 in FIG. 9 is for urging pressure plate 46 against film disk 24. Its structure and operation are clearly described in aforementioned Sethi patent application Serial No. filed concurrently herewith.

This invention has been described in detail with particular reference to the preferred embodiment thereof, but it will be understood that variations and modifications can be effected within the spirit and scope of the invention.

I claim:

1. In a photographic cartridge assembly of the type including (1) an opaque casing, a wall of which has an exposure window, and (2) a film unit mounted in the casing for movement in a film advancing direction relative to the casing such that successive portions of the film unit align with the exposure window, the improvement comprising:
   a cover member including an opaque region, said cover member being mounted in the casing between the wall and the film unit for movement, independent of the film unit, between a closing position in which said opaque region is aligned with and closes the exposure window, and an opening position in which said opaque region is out of alignment with and opens the exposure window;
   means associated with the film unit and said cover member for inhibiting movement of the film unit in its film advancing direction when said cover member is in its exposure window closing position; and
   means for disabling said movement inhibiting means when said cover member is in its exposure window opening position.

2. The improvement as defined in claim 1 wherein said movement inhibiting means comprises:
   discontinuity means on the film unit; and
   a tooth on said cover member which engages said discontinuity means when said cover member is in its exposure window closing position.

3. The improvement as defined in claim 2 wherein said discontinuity means includes a plurality of discontinuities, one discontinuity being associated with each of said successive film unit portions.

4. The improvement as defined in claim 2 wherein said discontinuity means includes a plurality of discontinuities, one discontinuity being associated with each of said succesiive film unit portions for metering a camera's film advance mechanism.

5. The improvement as defined in claim 2 wherein said disabling means comprises a separator layer mounted in the casing between said cover member and the film unit for inhibiting connection between said tooth and said discontinuity means when said cover member is in its exposure window opening position.

6. The improvement as defined in claim 5 wherein said separator layer has an aperture through which said tooth engages said discontinuity means when said cover member is in its exposure window closing position.

7. The improvement as defined in claim 2 wherein said tooth is on said opaque region remote from the exposure window.

8. In a photographic cartridge assembly of the type including (1) an opaque casing, a wall of which has an exposure window, (2) a film unit having a photographic film disk with an exposure region, and (3) means mounting the film unit in the casing for rotational movement in a film advancing direction relative to the casing such that successive portions of the exposure region align with the exposure window, the improvement comprising:
   a cover member including an opaque region, said cover member being mounted in the casing between the wall and the film disk for movement, independent of the film unit, between a closing position in which said opaque region is aligned with and closes the exposure window, and an opening position in which said opaque region is out of alignment with and opens the exposure window;
   means associated with the film unit and said cover member for inhibiting movement of the film unit in its film advancing direction when said cover member is in its exposure window closing position; and
   means for disabling said movement inhibiting means when said cover member is in its exposure window opening position.

9. The improvement as defined in claim 8 wherein said movement inhibiting means comprises:
   discontinuity means on the film unit; and
   a tooth on said cover member which engages said discontinuity means when said cover member is in its exposure window closing position.

10. The improvement as defined by claim 9 wherein said discontinuity means includes a plurality of notches along the periphery of the film disk, one notch being associated with each of said portions of the exposure region.

* * * * *